Figure 1:
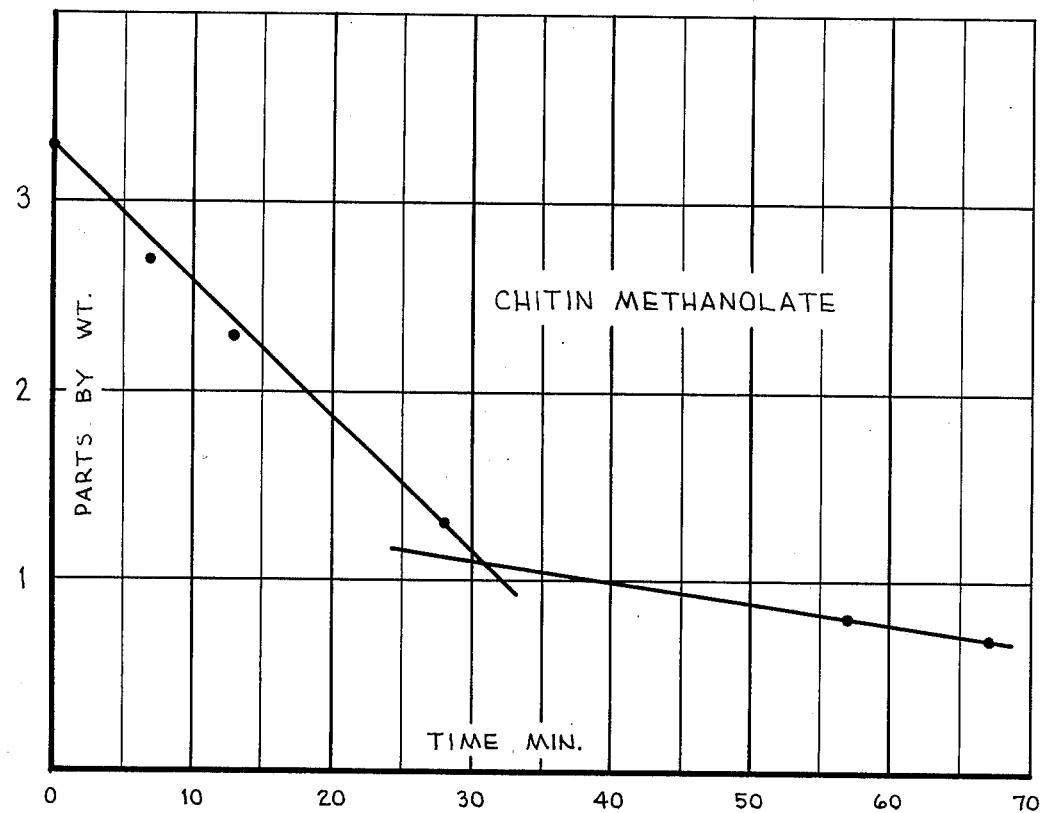

United States Patent [19]

Austin

[11] 4,063,016
[45] Dec. 13, 1977

[54] CHITIN COMPLEXES WITH ALCOHOLS AND CARBONYL COMPOUNDS

[75] Inventor: Paul R. Austin, Wilmington, Del.

[73] Assignee: University of Delaware, Newark, Del.

[21] Appl. No.: 640,583

[22] Filed: Dec. 15, 1975

[51] Int. Cl.² .............................................. C08B 37/08
[52] U.S. Cl. ....................................... 536/20; 424/180
[58] Field of Search ....................... 260/211 R; 536/20

[56] References Cited

U.S. PATENT DOCUMENTS

| 1,929,786 | 10/1933 | Meyer | 260/211 R |
| 2,072,771 | 3/1937 | Rigby | 260/211 R |
| 2,163,104 | 6/1939 | Salzberg | 260/211 R |
| 2,669,529 | 2/1954 | Rust | 260/211 R |
| 2,670,329 | 2/1954 | Jones | 260/211 R |
| 2,783,148 | 2/1957 | Gyorgy et al. | 260/211 R |
| 2,842,049 | 7/1958 | Delangre | 260/211 R |
| 3,847,897 | 11/1974 | Dunn et al. | 260/211 R |

OTHER PUBLICATIONS

Seichertova, O. et al., "Chem. Abst." vol. 79, p. 112580(b), 1973.

Primary Examiner—Johnnie R. Brown

[57] ABSTRACT

New compositions of matter comprising complexes of chitin with lower molecular weight alcohols, aldehydes and ketones have been discovered. These complexes are useful in the solution and purification of chitin and in the preparation of modified chitins for fibers, films and plastics, and for pharmaceutical purposes.

7 Claims, 5 Drawing Figures

CHITIN COMPLEXES WITH ALCOHOLS AND CARBONYL COMPOUNDS

The Government has rights in this invention pursuant to Grant No. 04-3-158-30 awarded by the U.S. Department of Commerce.

This invention relates to new addition compounds or complexes of chitin and their method of manufacture.

PRIOR ART

Chitin is a cellulose-like material that occurs widely in nature, for example, in the cell walls of fungi and the hard shells of insects and crustaceans. More specifically, chitin is a mucopolysaccharide, poly-N-acetyl-D-glucosamine, of relatively high molecular weight. However, in the natural state it occurs only in small flakes or as short fibrous material, and is not capable of forming useful shaped articles without solution and reprecipitation or renaturing. Methods of dissolving chitin in certain solvents are described in the literature. For example, Clarke and Smith, J. Phys. Chem., 40, 863 (1936), used aqueous acids or lithium salts for solution and regeneration of chitin. These authors observed the formation of addition compounds of chitin with lithium thiocyanate and with sodium hydroxide under certain conditions. However, the formation of addition compounds, or complexes, of chitin with organic compounds has not hitherto been described.

OBJECTS OF THE INVENTION

It is an object of this invention to provide novel complexes of chitin with low molecular weight alcohols, aldehydes and ketones. It is a further object to provide a process for preparing these now chitin complexes.

DRESCRIPTION OF THE INVENTION

The compositions of this invention are complexes of chitin with alcohols, aldehydes and ketones preferably having up to 10 carbon atoms. A preferred group of the complexes are those having a mole ratio of the N-acetylglucosamine unit of chitin to oxygen-containing complexing agent ranging from 1:6 to 5:1. . Especially preferred compositions of this invention are the complexes of chitin with alcohols, aldehydes and ketones having up to five carbon atoms. The alcohols, aldehydes and ketones can have one or more halogen substituents, e.g., chlorine.

The chitin complexes of this invention can be prepared by direct contact of chitin with an excess of lower molecular weight alcohol, aldehyde or ketone, i.e., at least five parts by weight of the complexing agent to one part of chitin. However, it is preferred to use a water- or solvent-swelled chitin with the complexing agent. It is also preferred to use a finely comminuted chitin to increase the rate of interaction between the chitin and the alcohol or carbonyl compound.

A mass action effect is observed in this process. That is, one complexing agent in a chitin complex can be displaced with another if a substantial excess of the second complexing agent is allowed to interact with the previously formed complex.

With low boiling complexing agents such as methanol and acetone the chitin complex has a relatively high vapor pressure of the alcohol or carbonyl component under ambient conditions which results in decomposition of the complex with drying of the chitin, unless the complex is stored in a closed container in the presence of a slight excess of the complexing alcohol or carbonyl compound.

In other cases, where molecular association forces are stronger, when chemical reaction may be involved, or when higher boiling complexing agents are employed, even an excess of a second complexing agent may not displace a favored complexing agent.

The chitin complexes of this invention have a number of unusual properties, which make them useful in a variety of applications. For example, they have a voluminous physical form which makes them easily handled and filtered in the preparation of highly purified chitin for pharmaceutical and other purposes. Furthermore, they are more readily dissolved in chitin solvents than natural chitin, and hence are useful in preparing chitin solutions for the fabrication of chitin in the form of films, fibers, or other shaped articles; they also may contribute a plasticizing effect that enhances the cold drawing of chitin fibers and films. The complexes, in addition, facilitate renaturing of chitin to fibrillar material useful for wound-healing acceleration, e.g., in the manufacture of fibrous mats for absorbable, internal reinforcement of herniated areas. Chitin complexes with higher molecular weight aldehydes and ketones have greater stability and exhibit the toughness and formability required for the manufacture of plastic products.

The products and processes of this invention are illustrated in greater detail in the following examples in which quantities of ingredients are expressed in parts by weight or percent by weight, unless otherwise specified.

The drawings are graphs supporting the fact that complexes are formed as fully explained in the examples.

EXAMPLE I

One part of water-swelled chitin is placed in 10 parts of methanol and comminuted to permit thorough penetration and interaction of the methanol. After standing for two hours the chitin alcoholate slurry is filtered off and redispersed in 10 parts of fresh methanol. After standing an additional hour the chitin alcoholate is filtered off and spread on a tray to dry; the product is broken up and turned during the drying period to present fresh surface facilitate drying. This operation is carried out at room temperature in an area of good air flow.

To demonstrate chitin complex formation, weight loss of the drying complex is determined versus time, in the expectation that superficial solvent would be lost more rapidly than complexed solvent, as is the case with such known materials as calcium sulfate and its hydrates. The intercept of the two rate curves approximates the composition of the complex. The data follow:

| Time, min. | Parts by wt. | |
|---|---|---|
| 0 | 3.3 | |
| 7 | 2.7 | |
| 13 | 2.3 | |
| 28 | 1.3 | |
| 57 | 0.8 | |
| 67 | 0.7 | (dry) |

It will be noted from the table and especially from FIG. 1, which expresses these data in graphical form, that there is an abrupt change in solvent evaporation rate after the fourth period, with an intercept corresponding to a complex of 0.7 part of chitin monomer and 0.36 part of methanol (0.0034 and 0.011 moles, respectively) or a ratio of 3.2 moles of methanol per N-acetylglucosamine residue.

The chitin-methanol complex is a pasty, somewhat cheesy material that is stable at room temperature if kept in a closed vessel in the presence of a slight excess of methanol. However, in the open, it will lose methanol gradually as indicated above.

EXAMPLE II

One part of water-swelled chitin is placed in 10 parts of methanol and comminuted to permit thorough penetration and interaction of the methanol. After standing for two hours the chitin alcoholate is filtered off and redispersed in 10 parts of acetone. The dispersion, standing for 15 minutes, and filtration is repeated two more times to assure complete displacement of the methanol and formation of the acetonate. The acetonate is somewhat more rubbery and cheesy than the alcoholate and filters very rapidly.

After the last filtration, the acetone-wet chitin acetonate is dried in a tray at room temperature with good air movement around it. The weight loss of a sample is measured at time intervals until the sample is thoroughly dry. The data follow:

| Time, min. | Parts by wt. | Time, min. | Parts by wt. |     |
|------------|--------------|------------|--------------|-----|
| 9          | 0.076        |            |              |     |
| 10         | .064         | 20         | .039         |     |
| 11         | .054         | 25         | .035         |     |
| 12         | 0.48         | 30         | .033         |     |
| 13         | .045         | 35         | .031         |     |
| 14         | .043         | 40         | .030         |     |
| 15         | .042         | 60         | .029         |     |
| 16         | .041         | 120        | .028         |     |
| 18         | .040         | 180        | .025         | (dry) |

Figure 2:
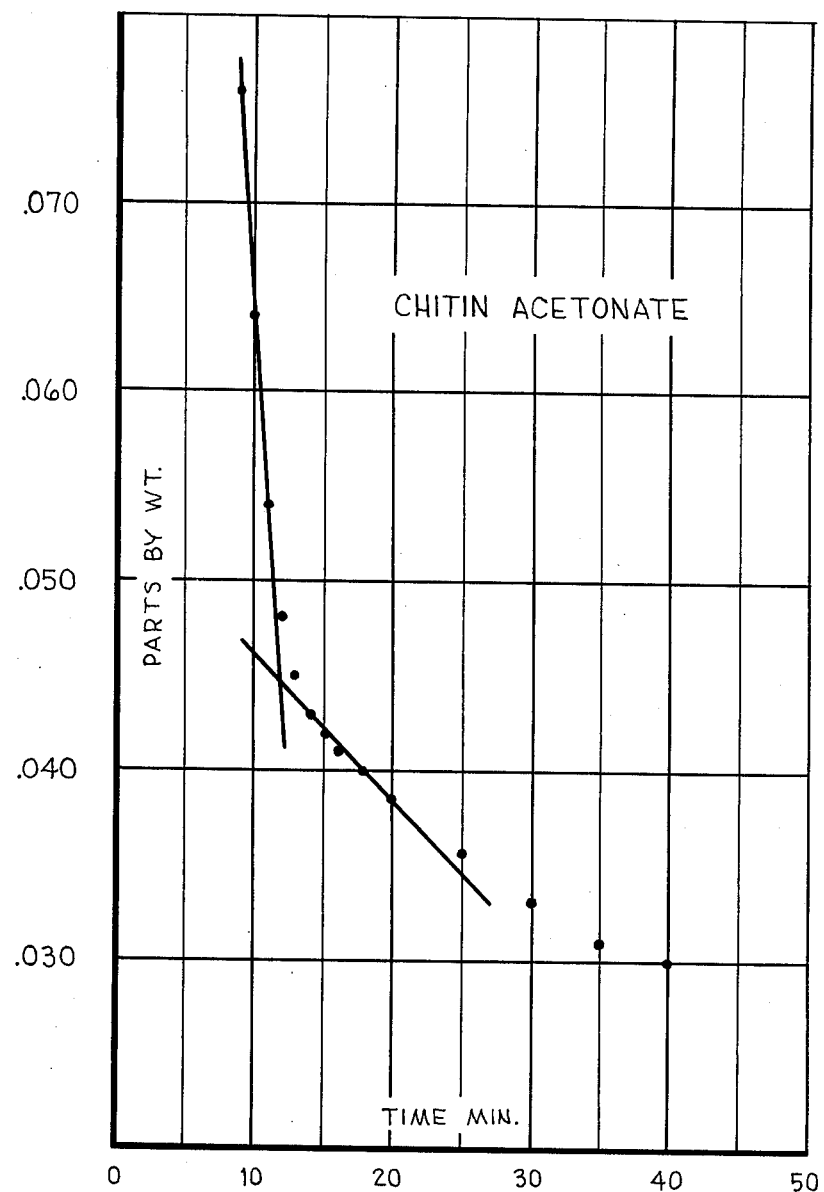

In this case, inspection of the data does not give a ready indication of the difference in rate of solvent loss of simple evaporation versus complex breakdown and diffusion of solvent vapor, but by plotting time versus weight loss on a simple graph, FIG. 2, it is clearly seen that two different rates are involved. The intersection of these curves corresponds to a product comprising 0.025 part of chitin and 0.019 part of acetone (0.000123 mole of chitin monomer and 0.00033 mole of acetone) or a mole ratio of acetone to N-acetylglucosame of 2.7:1. This chitin acetonate complex is slowly soluble in formic acid at room temperature whereas the original chitin is not soluble in formic acid.

Figure 3:
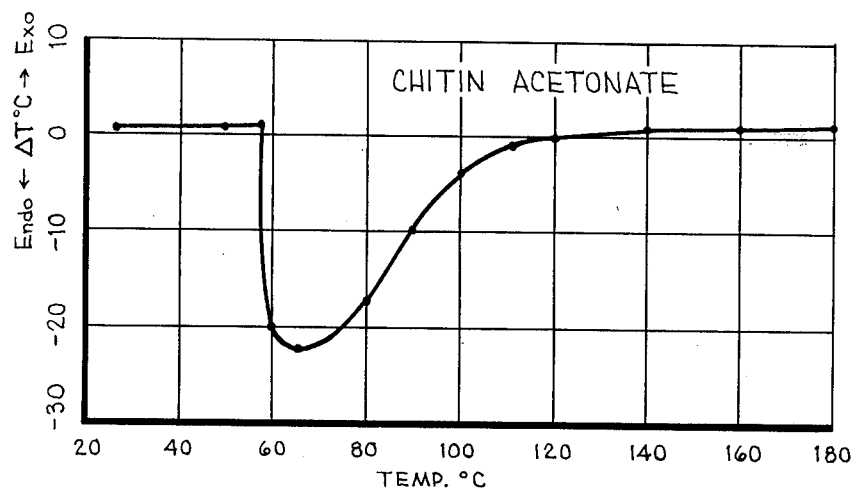

Another method of characterizing the chitin complexes of this invention involves the use of differential thermal analysis, which measures the heat energy change occurring in a substance as a function of temperature. The curves obtained, called thermograms, show any chemical change that is accompanied by a heat energy change. Differential thermal analysis has been widely used in studies of the chemistry of inorganic and organic compounds, including studies of hydrates of various compounds. The thermogram obtained on the chitin-acetone complex of this Example is given in FIG. 3. In this determination the temperature of the chitin-acetonate and the inert control material is increased at a constant rate of 20° C per minute. The resulting thermogram shows a sharp endothermic heat change beginning at 75° C. The thermograms obtained with the ketone complexes of this Example and those of Examples V and VI show the strong association of the ketones to the chitin.

EXAMPLE III

One part of an amorphous, precipitated chitin and 0.7 part of camphor are dissolved in 17 parts of formic acid. The homogeneous solution is spread on glass and the formic acid allowed to evaporate. A hard, flaky, tough camphor complex results that appears to be stable in air. In contrast to the original powdery chitin, the product is difficult to grind; it is tough rather than friable. Upon grinding, some fibrillar material is formed along with a nearly white powder. There is no indication of the separation of camphor itself.

EXAMPLE IV

Two parts of red crab chitin are dissolved in 87 parts of a solvent mixture comprised of 40 percent trichloroacetic acid, 40 percent chloral hydrate and 20 percent methylene chloride. Solution is accelerated by warming slightly, below 40° C, stirring for 30 minutes. A very thick, viscous solution is obtained that is filtered through wool felt.

A portion of the filtered chitin solution is spread upon glass to a thickness of about one-sixteenth inch. It is immersed in acetone to coagulate it and is washed in four successive acetone washes, each lasting 15 minutes. It is then neutralized and washed with a solution of potassium hydroxide in 2-propanol and finally with water to a pH of 7. The film is tough, clear and ductile, and has a sp. gr. of 1.46 - 1.47. Analysis shows the presence of 33.28 percent chlorine, indicating a ratio of about one mole of unhydrated chloral to one mole of N-acetylglucosamine in the complex (30.4 percent chlorine calculates for 1:1 complex.)

In this example, the strong affinity of chloral for chitin is illustrated, as the successive acetone and alkaline 2-propanol washes do not form new complexes, although they probably remove superficial chloral. However, when the complex is extracted for 12 hours with methylene chloride, with continuous removal of the extract and treatment with fresh solvent (Soxhlet), the complex contains 9.45 percent chlorine, indicating a ratio of about 5 N-acetylglucosamine units to one of unhydrated chloral.

EXAMPLE V

One part of water-swelled chitin is washed with two successive portions of acetone, and dried superficially in air at room temperature to remove excess acetone, but not enough to decompose the complex. The resulting chitin-acetone complex is immersed in five parts of methyl isobutyl ketone and comminuted for 15 minutes to permit thorough penetration and interaction of the methyl isobutyl ketone. The chitin ketonate is then filtered off and redispersed in three more five-part portions of methyl isobutyl ketone with filtration after each successive soaking. This treatment produces complete replacement of the acetone in the acetonate with formation of the chitin methyl isobutyl ketonate. The ketonate is dried superfically in air at room temperature with mechanical working of the product with a spatula.

Figure 4:
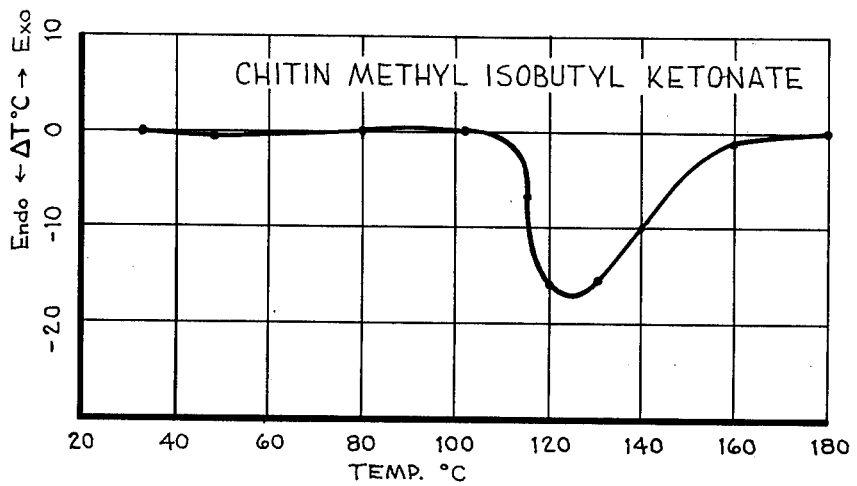

The differential thermal analysis thermogram of the ketonate of this Example is shown in FIG. 4. With the chitin complex and the inert control material heated at a constant rate of increase of 20° C per minute an endothermic heat change begins at about 104° C and becomes a sharp change at about 114° C.

EXAMPLE VI

One part of water-swelled chitin is immersed in five parts of methyl ethyl ketone and comminuted for 15 minutes to permit thorough penetration of the methyl ethyl ketone into the porous chitin. The swollen chitin complex is then filtered off and redispersed in three more five-part portions of methyl ethyl ketone with filtration after each successive soaking. This treatment produces complete replacement of the water in the swollen chitin with formation of chitin methyl ethyl ketonate. The complex is superficially dried in air at room temperature with mechanical working of the product with a spatula.

Figure 5:
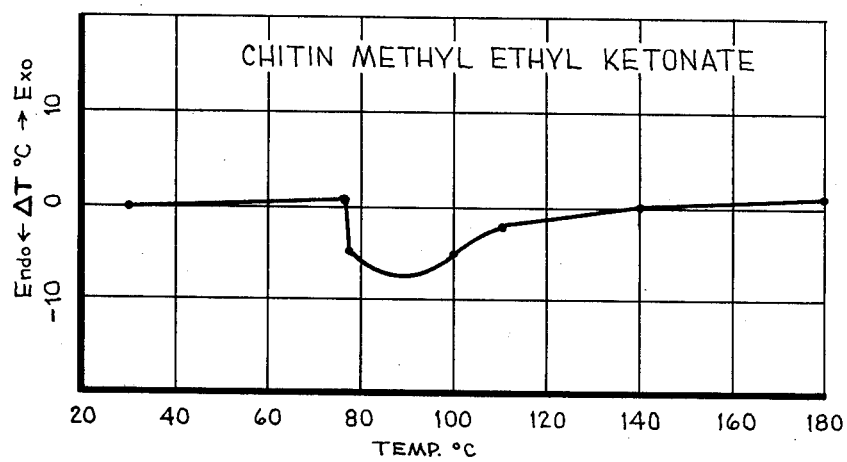

The differential thermal analysis thermogram of the ketonate of this Example is given in FIG. 5. With the chitin complex and the inert control material heated at a constant rate of increase of 20° C per minute a sharp endothermic heat change begins at 77° C.

EXAMPLE VII

This Example illustrates the use of the process of forming a chitin alcohol complex as an intermediate in the formation of a phosphate salt of chitin.

One part by weight of chitin and 40 parts by volume of a 50:50 (by volume) mixture of phosphoric acid and 2-propanol are stirred together at room temperature for two hours. The mixture if filtered through wool felt and the filtrate poured in a fine stream into a large excess of 2-propanol to precipitate the chitin in the form of a chitin 2-propanol complex. The solvent-swelled chitin is filtered through paper and resuspended with vigorous stirring in fresh 2-propanol for about 15 minutes. This wash and filtration is repeated three more times, at which point the system is neutral. The filter cake is then spread in an open tray with good ventilation at room temperature and the product worked with a spatula to break up the caked material and continually present new surfaces for solvent evaporation. The product is a fine, light-colored powder that passes readily through a 100-mesh sieve (openings of about 157 microns).

Since chitin may contain one free amino group for about every six N-acetylglucosamine units, and the acid in this system was not neutralized, it is believed that the product is a chitin phosphate salt.

Properties of the sample are as follows:

| Sp. gravity | 1.422 | |
|---|---|---|
| Nitrogen | 6.57% | (6.57%) calcd. |
| Phosphorus | 2.54% | (2.43%) calcd. |

It was reported by an outside laboratory that this product was effective as a wound-healing accelerator in preliminary tests in rats.

The examples given above are selected to illustrate significant aspects of the invention, but are not to be considered limiting. Various modifications and equivalents will be obvious to one skilled in the art. Some of these variations are described below.

Chitin from many sources can be used to make the products of this invention. Chitin from arthropods, in particular from the shells of crabs, shrimp, crayfish, lobsters and other crustaceans is operable. Crabs such as, for example, blue, red, rock, king, and Dungenes crabs are especially good sources of chitin. Chitin from other sources such as cell walls of fungi, e.g., the fungal residues from fermentation processes involving such fungi as *Asperigillus niger* or Penicillium. Chitins of high molecular weight are preferred for use in this invention.

The water-swelled chitin, or hydrated chitin, used in Examples I and II, is an especially preferred form of chitin for use in preparing the chitin complexes of this invention. A convenient method of making hydrated chitin is as follows:

Five parts of chitin (8 mesh) is added to a mixture of 63 parts of 2-chloroethanol and 82 parts of 73% sulfuric acid, with mechanical stirring at room temperature. Small additional portions of solvent may be added if necessary to reduce the viscosity. After one hour the mixture is filtered through felt. A solution of 88 parts of conc. ammonium hydroxide and 100 parts of water is cooled in an ice bath in a vessel equipped for mechanical stirring. The above chitin solution is then poured in a fine stream, with rapid stirring, into the ammonia solution. Additional ammonia may be added if necessary to make alkaline. When the addition is complete and the solution alkaline, the system is stable and may be kept for several days, if necessary. The precipitated chitin is decanted, filtered or centrifuged, and the precipitate reslurried in water made slightly alkaline with ammonia. After 15 minutes the precipitate is again filtered, and the slurry-washing repeated with plain water until it is free of sulfate ion (barium chloride test). Two to four washes may be required. The resultant product is a hydrated chitin and may be kept as such in a stoppered bottle.

As indicated above, alcohols, aldehydes and ketones having up to 10 carbon atoms are useful in forming the chitin complexes of this invention. Specific examples of alcohols that can be used are the aliphatic alcohols: methanol, ethanol, propanol, 2-propanol, chloroethanol, and butanol. Cyclohexanol is a useful alicyclic alcohol. Aliphatic and alicyclic ketones that are useful include; acetone, methyl ethyl ketone, diethyl ketone, methyl propyl ketone, methyl isobutyl ketone, acetyl acetone, cyclopenatanone, and camphor. Suitable aliphatic aldehydes include: formaldehyde, acetaldehyde, propionaldehyde, n-butyaldehyde, isobutyaldehyde and chloral. As indicated previously, the alcohol, aldehyde and ketone reactants can have halogen substituents, e.g., one or more chlorine substituents.

It is apparent that changes and modifications may be made without departing from the invention in its broader aspects. The aim of the appended claims, therefore, is to cover all such changes and modifications as fall within the true spirit and scope of the invention.

I claim:

1. A complex of chitin with an oxygen-containing complexing agent containing up to 10 carbon atoms selected from the group consisting of saturated aliphatic and alicyclic alcohols, aldehydes, and ketones, said complex having a sharp endothermic heat change when subjected to differential thermal analysis.

2. A complex of claim 1 wherein the oxygen-containing complexing agent contains up to 5 carbon atoms.

3. The complex of claim 1 wherein the mole ratio of N-acetylglucosamine unit of chitin to the oxygen-containing complexing atent ranges from 1:6 to 5:1.

4. The complex of claim 3 wherein the oxgen-containing complexing agent is methanol.

5. The complex of claim 3 wherein the oxygen-containing complexing agent is acetone.

6. The complex of claim 3 wherein the oxygen-containing complexing agent is chloral.

7. The complex of claim 1 wherein the oxygen-containing complexing agent is camphor.

* * * * *